(12) United States Patent
Gallup et al.

(10) Patent No.: US 6,201,540 B1
(45) Date of Patent: Mar. 13, 2001

(54) GRAPHICAL INTERFACE COMPONENTS FOR IN-DASH AUTOMOTIVE ACCESSORIES

(75) Inventors: Robert Gallup, Seattle; Steven P. Masters, Kent; Bob McKenzie, Kirkland; Benjamin N. Rabelos; William Vong, both of Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/003,682

(22) Filed: Jan. 7, 1998

(51) Int. Cl.⁷ ............................. G06F 3/00; G06F 3/14; G06F 19/00

(52) U.S. Cl. .................... 345/339; 345/146; 345/348; 345/352; 345/341; 345/970; 701/36

(58) Field of Search ................. 345/146, 333–336, 345/339, 341, 348, 352, 354, 902, 961, 970, 978; 701/24, 36

(56) References Cited

U.S. PATENT DOCUMENTS

| | | | | |
|---|---|---|---|---|
| 4,731,769 | * | 3/1988 | Schaefer et al. | 701/36 X |
| 4,809,177 | * | 2/1989 | Windle et al. | 701/36 X |
| 5,063,513 | * | 11/1991 | Shank et al. | 701/36 |
| 5,089,826 | | 2/1992 | Yano et al. | 342/457 |
| 5,363,481 | * | 11/1994 | Tilt | 345/352 |
| 5,404,443 | * | 4/1995 | Hirata | 345/352 X |
| 5,555,172 | | 9/1996 | Potter | 364/424.01 |
| 5,687,331 | * | 11/1997 | Volk et al. | 345/334 X |
| 5,694,562 | * | 12/1997 | Fisher | 345/352 X |
| 5,706,448 | * | 1/1998 | Blades | 345/352 X |
| 5,781,872 | * | 7/1998 | Konishi et al. | 701/36 |
| 5,798,760 | * | 8/1998 | Vayda et al. | 345/352 |
| 5,821,631 | * | 10/1998 | Loraas et al. | 701/36 X |
| 5,821,935 | * | 10/1998 | Hartman et al. | 345/352 X |
| 5,828,360 | * | 10/1998 | Anderson et al. | 345/352 X |
| 5,859,642 | * | 1/1999 | Jones | 345/352 |

FOREIGN PATENT DOCUMENTS

| | | |
|---|---|---|
| 296 11 386 U1 | 11/1996 | (DE) . |
| 0 686 525 A1 | 3/1995 | (EP) . |
| WO 97/13657 | 4/1997 | (WO) . |

OTHER PUBLICATIONS

K. Tetsutoshi, "Method and Device for Indicating Scroll Direction", Patent Abstracts of Japan, Application #05217244 Sep. 1, 1993,.

* cited by examiner

Primary Examiner—Raymond J. Bayerl
Assistant Examiner—X. L. Bautista
(74) Attorney, Agent, or Firm—Lee & Hayes, PLLC

(57) ABSTRACT

An automobile computer system having a computer that runs an open platform operating system configured to support multiple applications, including applications that can be installed by a user. The system includes an operator interface that is mountable for viewing by an operator of an automobile. A plurality of application icons are scrollable across the visual operator interface by a user. The application icons correspond to applications supported by the operating system. The operator interface has a fixed focus position, wherein any application icon that is scrolled to the fixed focus position becomes focused and can be activated to select the application corresponding to the focused application icon. In some cases, icons are activated by leaving them focused for a predetermined timeout period. The system also includes a visual control that is available to application programs. The control includes any specified combination of items of the following types: (a) an edit item having a variable that is editable in response to a user select command; (b) an adjustable item having a variable that is changeable through a series of predefined values in response to user adjustment commands; (c) a selection item that opens a secondary control in response to a user select command; and (d) a combination item having a variable that is changeable through a series of predefined values in response to user adjustment commands, the combination item opening a secondary control in response to a user selection command.

62 Claims, 4 Drawing Sheets

GRAPHICAL INTERFACE COMPONENTS FOR IN-DASH AUTOMOTIVE ACCESSORIES

TECHNICAL FIELD

This invention relates to in-dash automotive accessories having bit-mapped graphical display panels, and to operator interfaces used in such automotive accessories. More particularly, the invention relates to menus of available application programs and to graphical control elements that are available to such application programs from an operating system of an automotive accessory.

BACKGROUND OF THE INVENTION

Microsoft Corporation has developed specifications and software for an automotive entertainment and computer accessory system that includes a variety of different elements such as a security subsystem, a navigation subsystem, and an entertainment subsystem. These elements are implemented in part by computer programs that execute under the control and supervision of an operating system.

The operating system implements a graphical user interface (GUI) similar to popular desktop operating systems. Such operating systems typically have application programming interfaces (APIs) for use by application programs. Application programs can use the APIs to easily create different types of operator interface controls. For example, the operating system might make available a "list box" control. A list box is used to display a list of choices, such as text, color, icons, or other graphics, from which the user can select one or more items. A variety of other controls are also available as described in Simon, Richard, *Windows 95 Win32 Programming API Bible, Book* 1, Waite Group Press, 1996. This reference is hereby incorporated by reference.

Although such controls have been very effective in the desktop environment, they are difficult to work with in an automotive accessory having a relatively small display size. The invention embodiment described below has a color graphics panel with a resolution of only 256×64 pixels. No more than about four lines of text can be legibly displayed on such a panel. This factor makes it very difficult to work with traditional controls such as list boxes, drop-dowm list boxes, combo boxes, etc.

In addition, there are other factors that must be considered when designing an effective operator interface in the automotive environment. For example, the lighting in an automobile often results in high display contrast and glare, accompanied by generally low light levels that make it difficult to discern small graphical elements, especially on LCD displays. Furthermore, the user of the operator interface is often the driver of the automobile, who should be able to perceive presented information with little more than a quick glance.

With these factors in mind, the inventors have sought to design an interface and associated controls that are more effective in the automobile environment than traditional interfaces and controls.

SUMMARY

The invention is implemented in an automotive accessory having a small display panel visible to the driver or other user of the vehicle. A user or operator interface in accordance with the invention includes a start menu having a horizontal row of application icons that are scrollable in response to user commands. The icons correspond to applications supported by the underlying hardware and software system, including after-market applications that are installed by users. The start menu has a fixed, centered focus position, with the icons being scrolled in either direction past the focus position.

There are several ways for a user to navigate to different icons. A "start" key initiates the start menu. After pressing the "start" key, left and right arrow keys can be used to scroll in either direction. Alternatively, pressing the "start" key repeatedly scrolls through the icons in one direction. If the focus is left on a particular icon for a predetermined duration, the icon and its corresponding application is automatically activated.

The automotive accessory has numeric keys that also serve as shortcut keys. The user can establish a correspondence between any shortcut key and an application icon. Pressing the shortcut key (after pressing the "start" key to initiate the start menu) immediately activates the corresponding icon and its application. Within the scrolled list, any application icons assigned to shortcut keys are displayed in the order of their shortcut keys.

The invention also includes a visual control, implemented by an operating system, for use by application programs, which allows a variety of different input items to be listed in the same control. Such a control includes any specified combination of items of the following types: (a) an edit item having a variable that is editable in response to a user select command; (b) an adjustable item having a variable that is changeable through a series of predefined values in response to user adjustment commands; (c) a selection item that opens a secondary control in response to a user select command; and (d) a combination item having a variable that is changeable through a series of predefined values in response to user adjustment commands, the combination item opening a secondary control in response to a user selection command.

DETAILED DESCRIPTION

Figure 1:
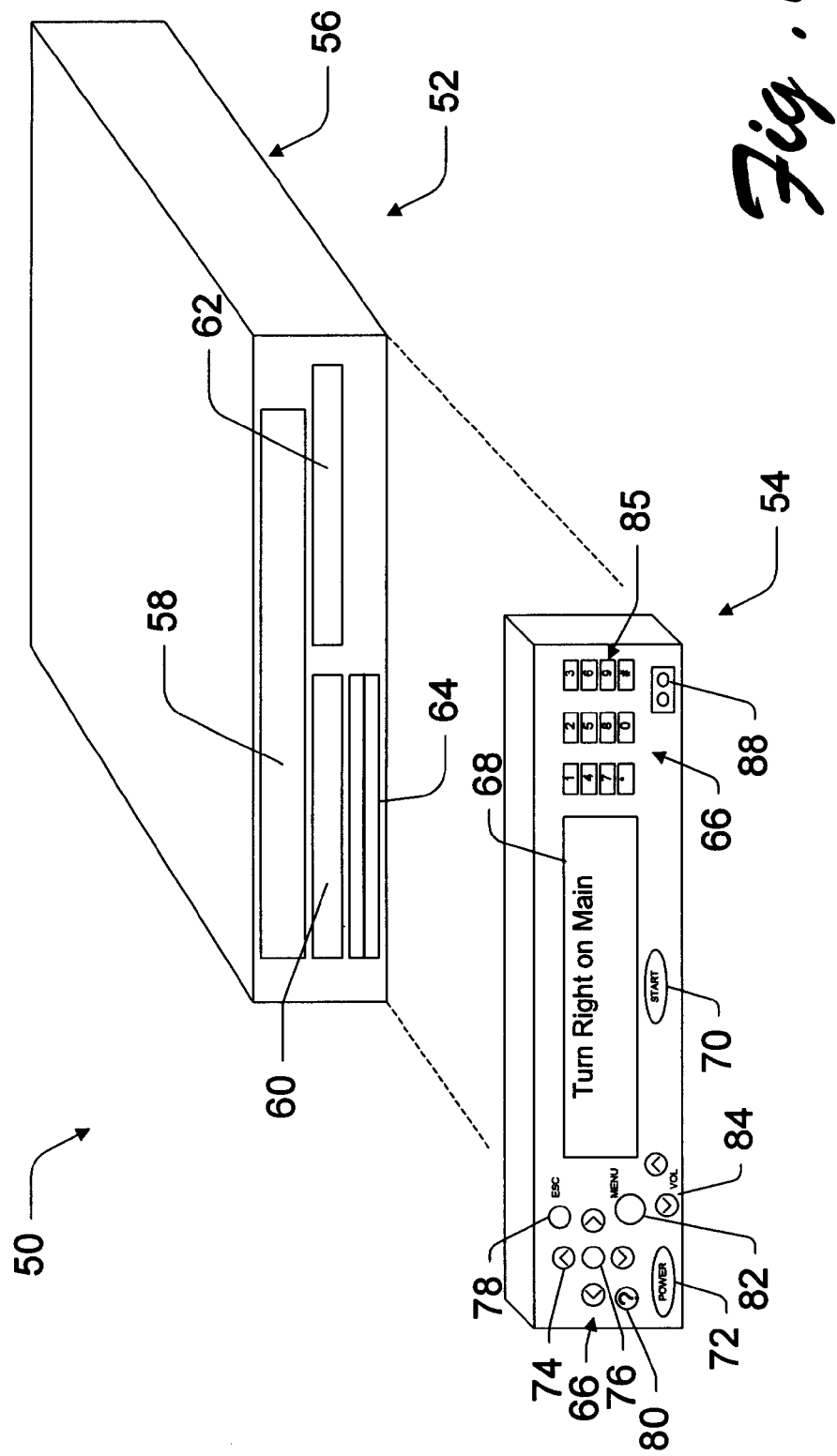
FIG. 1 is a perspective view of an in-dash automotive entertainment and computer accessory in accordance with the invention.

FIG. 1 shows an in-dash automotive entertainment and computer accessory 50 in accordance with the invention. In the illustrated implementation, the automotive accessory 50 is a vehicle computer that includes a variety of different elements as mentioned above. In other embodiments, the accessory might be a car radio, cassette player, CD player, or similar device with more extensive operator controls than are usually available in traditional accessories of these types.

Automotive accessory 50 has a base module 52 and a detachable faceplate 54. Base module 52 includes a housing 56, which is sized to be mounted in a vehicle dashboard similar to a conventional car stereo. Preferably, housing 56 has a form factor of a single DIN (Deutsche Industry Normen). The base module could alternatively be housed in a 2 DIN unit or other special form factor for an OEM.

In the described implementation, base module 52 is a computer that runs a multi-tasking operating system to support multiple applications. One preferred operating system is a Windows brand operating system sold by Microsoft Corporation, such as Windows 95, Windows CE, Windows NT or other derivative versions of the Windows family of operating systems. The computer and operating system are configured to support after-market peripherals including both hardware and software components. Applications supported by the operating system include audio entertainment applications, navigational applications, and system utility applications such as the well-known "control panel" application common in Windows operating systems. The automotive accessory also includes a speech recognition system that facilitates voice activation of various features, allowing the driver to verbally enter commands in a hands-free, eyes-free environment. After-market applications can be installed by a user after purchase of automotive accessory 50.

The operating system exposes various application programming interfaces (APIs) as is common in Windows operating systems. Such APIs can be called and used by application programs.

The computer 52 includes at least one storage drive that permits a user to download application programs and data from a storage medium. In the illustrated implementation, the computer 52 has a CD ROM drive 58 that reads application-related CDs, as well as musical, video, game, or other types of entertainment CDs. In this manner, the CD ROM drive 58 performs a dual role of storage drive and entertainment player. Also, a hard disk drive (not shown in FIG. 1) is included on the computer module 52. The hard disk drive can be used for storing both application programs and user data. The computer base module 52 has an optional 3.5" floppy diskette drive 60, a smart card reader 62, and dual PCMCIA card sockets 64 which accept PC (or PCMCIA) card types II and III. The faceplate 54 can be rotated to expose and permit easy access to the storage drives. In other implementations, the faceplate 54 has slots to permit access to one or more of the memory drives.

Faceplate 54 functions as an operator interface, having a keypad 66 and a graphical display 68. The faceplate is mountable for viewing by a vehicle operator. The display 68 is preferably a backlit LCD panel having a rectangular array of pixels that are individually selectable for illumination or display. The LCD panel is preferably a medium-resolution, bit-mapped display system having at least 10,000 pixels. In the described implementation, the array of pixels has a size of at least 256×64 pixels, which is quite limited in comparison to most desktop displays. The operating system of base module 52 interacts with faceplate keypad 66 and faceplate display 68 as peripheral devices when the faceplate 54 is attached to the base module 52.

The faceplate 54 has a start button or key 70 that provides the familiar "Start" functions of a Windows brand operating system, in addition to other functions that will be described below. The faceplate 54 also has a power button or key 72, four directional navigation keys or arrow keys 74 (including vertical and horizontal arrow keys), an "enter" button or item selection key 76, an "escape" button or key 78, a "help" button or key 80, a "menu" button or key 82, a volume control input 84, and a plurality of number keys 85.

Accessory 50 also supports an IrDA (infrared developers association) transceiver port 88 mounted on the faceplate 54 to transmit and receive data and programs using infrared signals.

Figure 2:
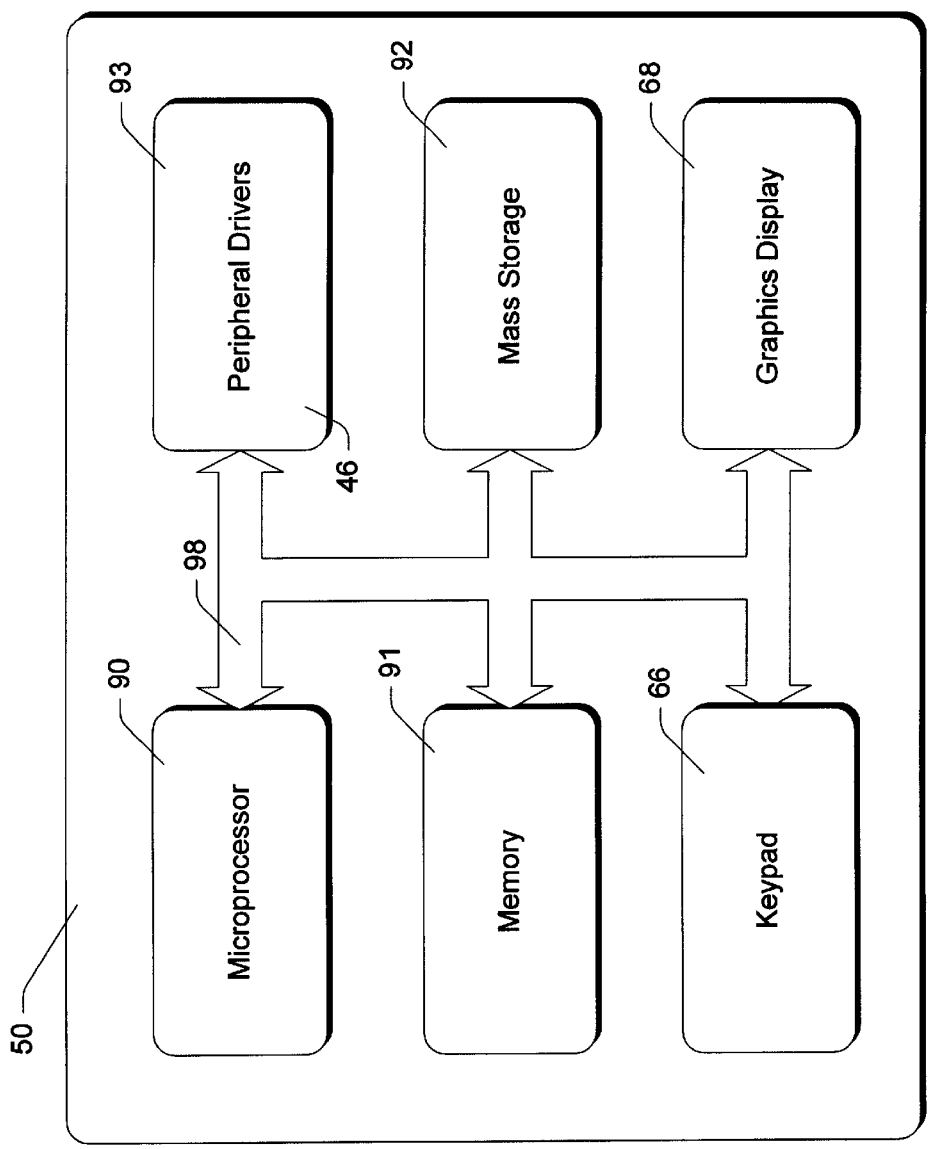
FIG. 2 is a block diagram of the in-dash automotive entertainment and computer accessory of FIG. 1.

FIG. 2 is a simplified block diagram showing pertinent components of automotive accessory 50. The device has a conventional computer architecture, including a microprocessor 90, associated addressable memory 91 (including non-volatile memory and high-speed volatile memory), optional mass storage 92, and peripheral drivers 93. In addition, the device includes keypad 66 and a graphics display 68. Other components, not shown, provide different types of entertainment functionality as described in the patent application cited above. The various components communicate internally through a parallel data bus 98.

The data processor of accessory 50 is programmed by means of instructions stored at different times in the various computer-readable storage media of the device. Programs are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps and features described below in conjunction with a microprocessor or other data processor. The invention also includes the computer and other devices themselves when programmed according to the methods and techniques described below.

Automotive accessory 50 can be used to integrate multiple vehicle-related systems onto one open platform. For instance, the accessory can serve as a multimedia entertainment system, a navigation system, a communications system, a security system, and a diagnostics system. Moreover, the accessory provides additional functionality traditionally associated with desktop and laptop personal computers. For instance, with the additional of a peripheral display device it can support word processing applications, spreadsheet applications, database applications, and appointment/schedule applications. Furthermore, the vehicle accessory 50 can be configured to operate as a server to other computing units in a vehicle to distribute games, video movies, and the like to passengers.

Vehicle accessory 50 may support a number of components and features that are not discussed herein. For more detail regarding such features refer to a U.S. patent application Ser. No. 08/564,586, entitled "Vehicle Computer System", which was filed Nov. 29, 1995 and is assigned to Microsoft Corporation. This application is hereby incorporated by reference.

Figure 3:
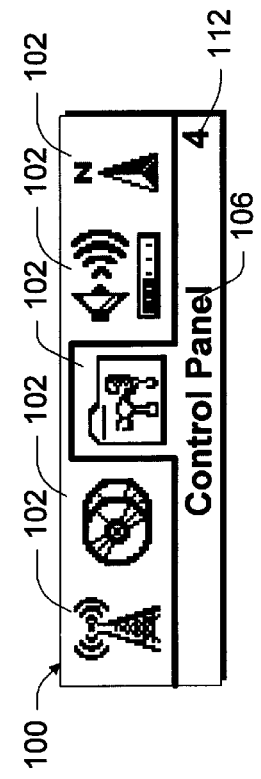
FIGS. 3–5 are illustrations of a start menu interface in accordance with the invention.

FIG. 3 shows a high-level visual operator interface 100 used in the exemplary embodiment of the invention, referred to herein as a "start" menu interface. The visual interface is created and presented by displaying the described elements on graphical display 68.

Start menu interface 100 has a plurality of application icons 102 that are scrollable horizontally on the visual operator interface in response to several different user commands. For example, repeatedly pressing the start key 70 scrolls the icons in a leftward direction. The directional navigation keys 74 also scroll through the icons in different directions: the up and right arrow keys scroll the icons to the left, while the down and left arrow keys scroll the icons to the right. Speech commands ("next" and "previous") are also available to scroll the icons.

Application icons 102 correspond to applications supported and executed by the operating system. For example, the centered icon 104 in FIG. 2 corresponds to a CD player application. Other icons might correspond to a radio application, an audio control application, a control panel application, etc. Some of the icons correspond to applications installed by the user of the automobile computer system. When a new application is installed by a user, an icon corresponding to the installed application is added to start menu interface 100 automatically by the operating system.

The start menu interface has a fixed focus position that is centered relative to the visible application icons; any application icon that is scrolled to the centered focus position becomes focused. The focus is indicated or highlighted by a changed color—the focused icon is displayed in color, while the surrounding non-focused icons are displayed in monochrome or greyscale. Icon 104 occupies the focus position in FIG. 3.

Figure 4:
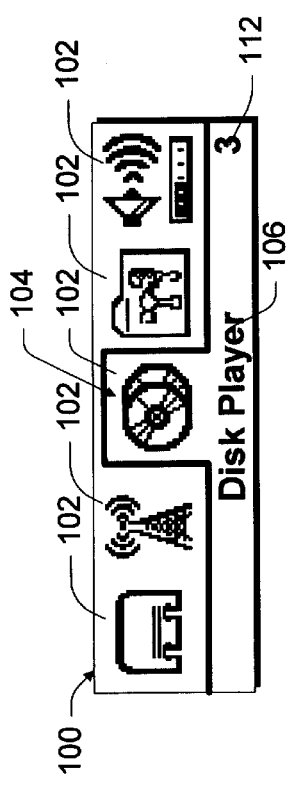

FIG. 4 shows the results of scrolling the icons horizontally to the left. The next application icon to the right (corresponding in this case to a control panel application) receives the focus.

The currently focused application icon is activateable to select or initiate the application corresponding to the focused application icon. A user activates the focused application icon by pressing the "enter" key 76. The focused application can also be activated through a speech command such as "select" "enter," or "start."

Furthermore, the start menu interface utilizes an automatic timeout selection scheme to activate applications. Specifically, after any particular application icon has been the subject of the focus for a predetermined timeout period, the focused icon and its application are automatically activated, without requiring the user to press the "enter" key.

The start menu interface has a field 106 that displays a textual name of the application corresponding to the currently focused application icon. In FIG. 3, the focused application icon corresponds to a CD player application, so field 106 displays the label "Disk Player." The displayed label also corresponds to a voice command that the user can speak to activate the icon.

Figure 5:
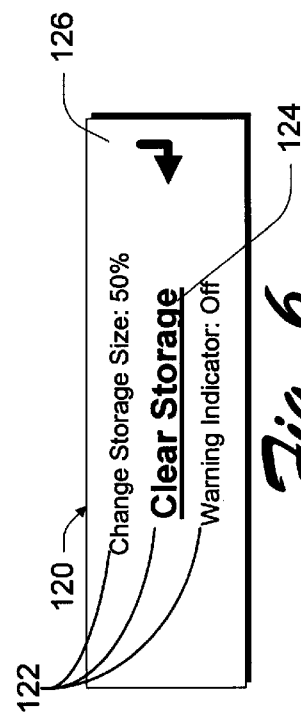

Referring now to FIG. 5, the start menu interface also has a field 108 that contains one or more general status enunciators. Such status enunciators are presented when one of the application programs running under the operating system has information such as status information for presentation to the user. For example, an exclamation point is used in FIG. 5 as a general status enunciator. Other indicators might be used to indicate different types of status or status information. In addition to the general status enunciator, application-specific status enunciators are presented in conjunction with application icons whose corresponding applications have information for presentation to the user. FIG. 5 shows an application icon with an application-specific status enunciator 110, comprising in this case a "mute" symbol over the application icon, indicating that the audio system is muted. When a user notices a general status enunciator, the user can then scroll through the available application icons to see which one has an application-specific status enunciator. Generally, the information or status held by the corresponding application program can be viewed by activating the application icon.

In addition to the methods mentioned above for scrolling and activating application icons, start menu interface 100 includes the use of shortcut keys or "hot" keys. In the described embodiment of the invention, numeric keys 85 comprise such shortcut keys. Each shortcut key can correspond to a respective application icon, so that each shortcut key activates that application icon and its corresponding application program. In the described embodiment, a shortcut key can be used whenever start menu interface 100 is displayed. If the start menu interface is not displayed, the user can first press the start key to display the start menu interface, followed then by one of the shortcut keys.

The operating system allows a user to establish the correspondence between shortcut keys and application icons. The user assigns a shortcut key by scrolling to the desired application icon and then pressing and holding the desired shortcut key for a predetermined duration.

The application icons are horizontally ordered on the display in accordance with their numeric shortcut keys. For example, the application icon corresponding to shortcut key 1 is presented first, followed by the application icon corresponding to shortcut key 2 and so on. A shortcut field 112 is maintained in the lower right-hand portion of the operator interface to indicate which shortcut key is assigned to the currently focused application icon. When the start menu interface is initially displayed, the icon corresponding to the "1" shortcut key receives the initial focus.

The availability of shortcut keys in combination with the timeout feature described above results in an interface that is particularly easy to use, with several ways for a user to activate a particular icon. To initiate the start menu interface, the user presses the "start" key, which automatically puts the focus at the icon having the number "1" shortcut key. The user can then press the "start" key repeatedly to move through the icons in the order of their shortcut keys. Pressing the "start" key four times, for example, moves to the same icon as using the number "4" shortcut key. Alternatively, the user can scroll through the icons in either direction with the horizontal directional navigation keys. Rather than pressing the "enter" key when the appropriate icon is displayed, the user can simply wait for expiration of the timeout, and the application corresponding to the focused icon will be activated. Alternatively, the user can press one of the shortcut keys (after pressing the "start" key) to move directly the corresponding icon, in which case the icon's application will be immediately activated, without waiting for the timeout. These characteristics allows the user to quickly initiate desired applications, often without requiring any significant visual attention. The timeout feature works in a similar way when the system is responding to voice commands. Thus, a user can navigate to a desired icon with voice commands, and that icon will be activated after a predetermined timeout. The user can initiate an application without waiting for the timeout, by speaking an appropriate voice command such as "START CD PLAYER," in which case the CD Player application will be launched immediately.

Since there are only ten numeric shortcut keys, only ten icons can correspond to shortcut keys. However, any remaining application icons can also be ordered for purposes of scrolling. These icons will be positioned after (to the right) of the icons corresponding to shortcut keys. The scrolling order is circular, so that these icons can be quickly viewed by pressing the "left" directional navigation key after pressing the "start" key to initiate the start menu. This is a convenient feature that allows even less frequently used applications to be easily accessed.

Although operator interface 100 has been described in terms of its visual and functional characteristics, the invention also includes program steps performed by microprocessor 90 and other components of accessory 50. Such program steps include scrolling a plurality of application icons in response to user scroll commands, focusing on any application icon that is scrolled to a fixed focus position, and activating the application corresponding to the focused application icon in response to a user selection command. In accordance with the invention, the start key and the directional navigation keys are interpreted as user scroll commands, while the enter key is interpreted as a selection key for activating application icons and their corresponding application programs.

As already mentioned, the operating system of accessory 50 includes APIs s for implementing user controls. Such APIs include a control interface having functions that are callable to create and use a visual control as shown in FIGS. 6–14 for display and entry of user-provided variables.

Figure 6:
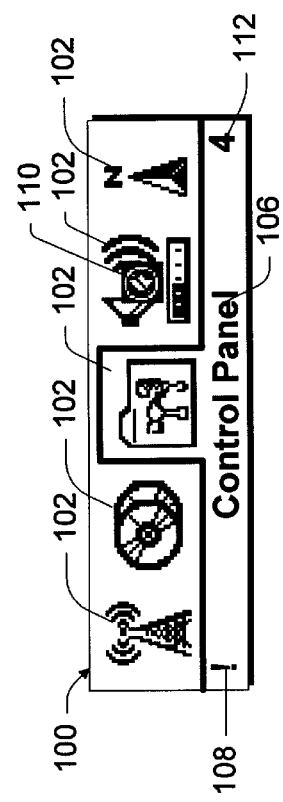
FIGS. 6–14 are illustrations of a visual control in accordance with the invention.

Referring to FIG. 6, a visual control 120 such as this has a plurality of text items 122 that can be scrolled vertically using the vertical directional navigation keys 74. The items are scrollable through a fixed, approximately centered, focus position. The focused item is indicated by ballooned text; any text within the focused item is displayed with a larger font than the text of non-focused items. The focused item is also indicated by color highlighting. In the drawings, the focused item is also indicated by underlining. As an optional feature, focused item having text or graphics that does not fit within the width of the control expands to overlie surrounding display items, so that all (or at least more) of the text or graphics can be seen when the item is focused.

It should be noted that the particular interface methods available to application programs allow the application programs to customize many aspects of the visual control. For example, the application program can disable the text ballooning feature so that more lines can be displayed in a single control, and can allow the focus to move vertically in situations where that is most convenient for the user. An application can also control the size of the control and can specify that items be scrolled in a circular fashion.

The visual control is configurable by an application program to contain any combination of one or more of the following types of items:

A selection item that opens a secondary control in response to a user select command.

An edit item having a variable that is editable in response to a user select command.

An adjustable item having a variable that is changeable through a series of predefined values in response to user adjustment commands.

A combination item having a variable that is changeable through a series of predefined values in response to user adjustment commands and that opens a secondary control in response to a user selection command.

These different types of items can be combined in a single control. For example, a single scrollable list of items within a particular control can include an edit item, an adjustable item, a selection item, and a combination item.

FIG. 6 illustrates visual control 120 with a selection item 124 scrolled to the focus position. The selection item comprises descriptive text associated with some function. Pressing the "enter" key 76 opens a new control, drills deeper into a menu structure, or performs some action determined by the application program that creates the visual control. An indicator graphic in the form of an enter symbol 126 at the right of selection item 124 indicates that the "enter" key can be pressed in conjunction with this control. In the example of FIG. 6, pressing the "enter" key performs a "clear storage" function.

Figure 7:
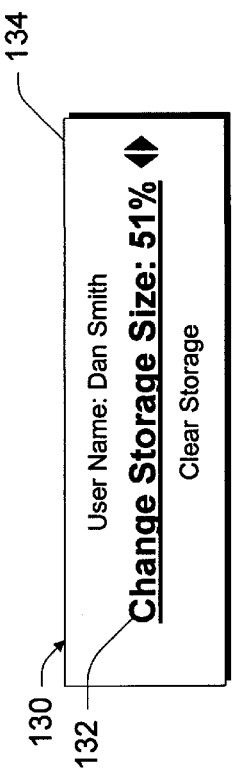
Figure 8:
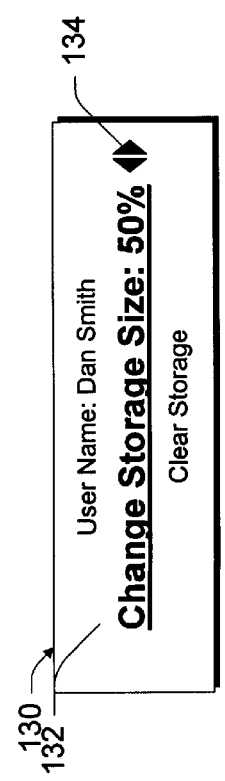

FIG. 7 illustrates a visual control 130 with an adjustable item selected 132. An adjustable item comprises an optional field label and a variable field that can be changed to a limited number of values. In this example, the field label is "Change Storage Size" and the variable field shows "50%". To change the variable field, a user presses the horizontal directional navigation keys. Each time the user presses one of these keys, the value of the adjustable item changes to the next or previous value in a list of values that is defined by the application program that created the control. In the illustrated example, the user presses the "right" arrow key to increment the variable field to "51%", as shown in FIG. 8. In other situations, a user might be able to change a value only between "on" and "off" values. Alternatively, it might be possible to change a value between a predefined set of textual values such as names. Indicator graphics 134 at the right of the selection item, comprising arrow symbols, indicate that the horizontal direction navigation keys can be pressed in conjunction with this control.

Figure 9:
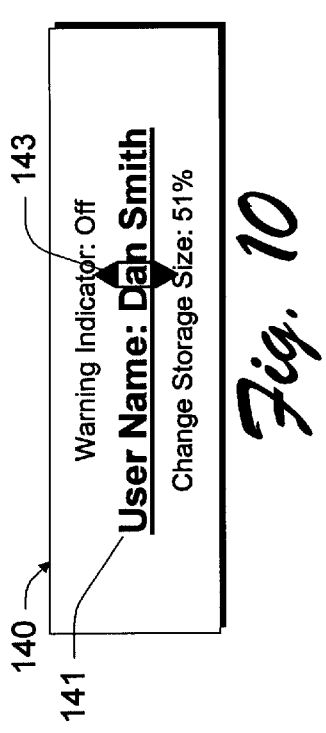
Figure 10:
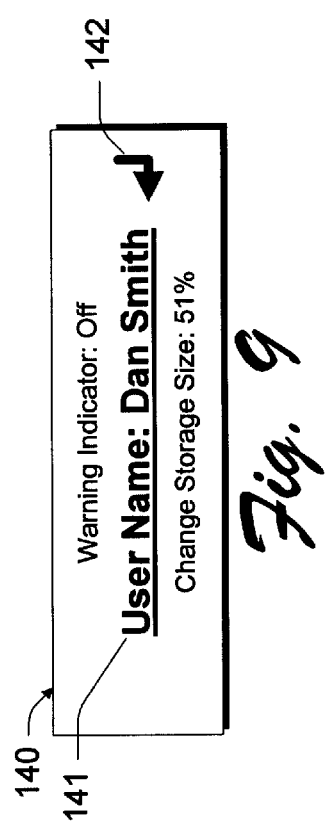

FIG. 9 illustrates a visual control 140 with an edit item 141 focused. The edit item comprises an optional label ("User Name") as well as alphanumeric text that is specified by a user ("Dan Smith"). Pressing the "enter" key initiates an edit is mode, shown in FIG. 10, so that the user can specify and edit the text. An "enter" indicator graphic 142 indicates that pressing the "enter" key is an available option. In the embodiment described herein, a spinner control 143 is used to edit the text. When the spinner control is over a symbol, the vertical directional navigation keys can be pressed to change the symbol through a sequence of values such as through the alphabet and through numerals 0–9. The horizontal directional navigation keys can be pressed to move the spinner control horizontally to a different symbol. Pressing the "enter" key exits the editing mode.

Figure 11:
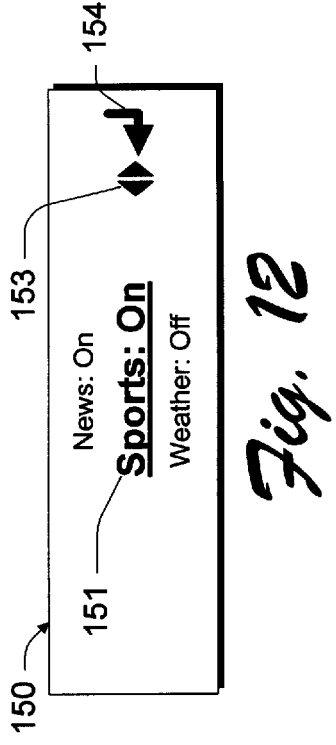
Figure 12:
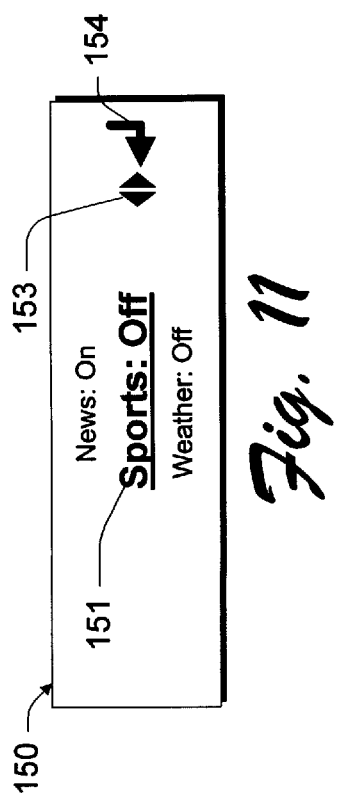
Figure 13:
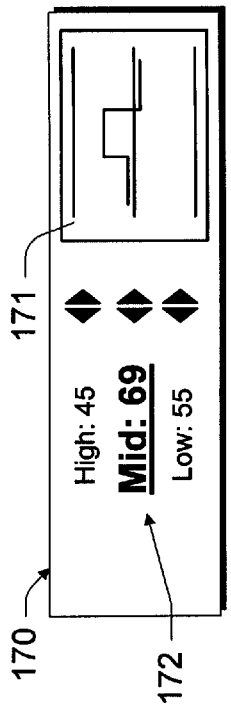

FIG. 11 illustrates a visual control 150 with a combination item 151 focused. A combination item has an optional field label ("Sports") and a variable field ("Off"). A user can change the variable between a limited number of predefined values by pressing the horizontal direction navigation keys. In the example of FIG. 11, the user can change the variable between "On" and "Off" values. FIG. 12 shows the result of pressing one of the horizontal direction navigation keys to change the value to "On". The user can also (or alternatively) press the "enter" key to open a secondary control or to perform some other action defined by the application program that created the control. Arrow symbols 153 and an enter symbol 154 at the right of the item indicate that two different actions can be performed on this item: either adjusting with arrow keys or pressing enter for more options. In this case, pressing the "enter" key results in a secondary control 160 as shown in FIG. 13, having a plurality of adjustable items allowing the user to toggle values for specific fields.

A user can also interact with visual controls such as these through voice commands.

Figure 14:
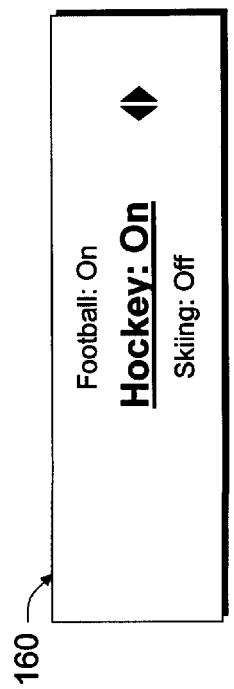

Each item can optionally be associated with a graphics image that changes to illustrate values of the item variables. For example, FIG. 14 shows a visual control 170 having a visual graph 171 that illustrates audio equalization as it is currently configured with controls 172. The exact nature of any such graph or graphic is determined by the application program that creates the various controls.

The described menu interface and visual controls provide effective means of interfacing with a user of an automotive accessory such as the one described herein. The described characteristics and features result in an interface that is easy to read and requires only simple actions to control. Furthermore, the described visual control enables a common control format to be used for a variety of data entry situations, while requiring only minimal display space.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An automobile computer accessory comprising:
    a computer;
    an operating system executable by the computer, to support multiple user-installable applications each of which having a corresponding application icon; and
    an operator interface, coupled to the computer, that is mountable for viewing by an operator of an automobile to display the application icons, the operator interface having a fixed focus position, wherein any application icon that is scrolled by a user to the fixed focus position becomes focused, the focused application icon being activateable to select the application corresponding to the focused application icon.

2. An automobile computer accessory as recited in claim 1, further comprising a start key that initiates the operator interface and scrolls through the application icons of the operator interface.

3. An automobile computer accessory as recited in claim 1, further comprising:
    a start key that initiates the operator interface and scrolls through the application icons of the operator interface;
    a plurality of directional navigation keys that scroll through the application icons in different directions.

4. An automobile computer accessory as recited in claim 1, further comprising:
    a start key that initiates the operator interface and scrolls through the application icons of the operator interface;
    a plurality of directional navigation keys that scroll through the application icons in different directions;
    wherein leaving the focus on a particular icon for a predetermined timeout activates the focused icon.

5. An automobile computer accessory as recited in claim 1, further comprising a plurality of shortcut keys on the operator interface, the shortcut keys corresponding to respective ones of the application icons, wherein a particular shortcut key activates the corresponding application icon to select the corresponding application.

6. An automobile computer accessory as recited in claim 1, further comprising a start key and a plurality of shortcut keys on the operator interface, the shortcut keys corresponding to respective ones of the application icons, wherein pressing the start key followed by a particular shortcut key activates the corresponding application icon to select the corresponding application.

7. An automobile computer accessory as recited in claim 1, further comprising:
    a start key that initiates the operator interface and scrolls through the application icons of the operator interface;
    wherein leaving the focus on a particular icon for a predetermined timeout activates the focused icon;
    a plurality of shortcut keys on the operator interface, the shortcut keys corresponding to respective ones of the application icons;
    wherein pressing the start key followed by a particular shortcut key activates the corresponding application icon to select the corresponding application without waiting for the predetermined timeout.

8. An automobile computer accessory as recited in claim 1, further comprising:
    a start key that initiates the operator interface and scrolls through the application icons of the operator interface;
    a plurality of directional navigation keys that scroll through the application icons in different directions;
    wherein leaving the focus on a particular icon for a predetermined timeout activates the focused icon;
    a plurality of shortcut keys on the operator interface, the shortcut keys corresponding to respective ones of the application icons;
    wherein pressing the start key followed by a particular shortcut key activates the corresponding application icon to select the corresponding application without waiting for the predetermined timeout.

9. An automobile computer accessory as recited in claim 1, further comprising:
    a start key that scrolls through the application icons;
    a plurality of shortcut keys on the operator interface, the shortcut keys corresponding to respective ones of the application icons;
    wherein pressing the start key followed by a particular shortcut key activates the corresponding application icon to select the corresponding application.

10. An automobile computer accessory as recited in claim 1, further comprising:
    a start key that scrolls through the application icons;
    a plurality of numeric shortcut keys on the operator interface, the numeric shortcut keys corresponding to respective ones of the application icons;
    wherein pressing the start key followed by a particular shortcut key activates the corresponding application icon to select the corresponding application; and
    wherein the operator interface indicates which numeric shortcut key corresponds to a particular application icon whenever that application icon is focused.

11. An automobile computer accessory as recited in claim 1, further comprising:
    a plurality of shortcut keys on the operator interface, the shortcut keys corresponding to respective ones of the application icons, wherein a particular shortcut key activates the corresponding application icon to select the corresponding application;
    wherein the operator interface allows the user to establish the correspondence between shortcut keys and application icons.

12. An automobile computer accessory as recited in claim 1, further comprising:
    a plurality of numeric shortcut keys on the operator interface, the shortcut keys corresponding to respective ones of the application icons, wherein a particular shortcut key activates the corresponding application icon to select the corresponding application;
    the application icons being ordered on the operator interface in accordance with their numeric shortcut keys.

13. An automobile computer accessory as recited in claim 1, wherein the application icons are scrollable across the operator interface in a sequentially repetitive fashion.

14. An automobile computer accessory as recited in claim 1, further comprising:
    a plurality of numeric shortcut keys on the operator interface, the shortcut keys corresponding to respective ones of the application icons, wherein a particular shortcut key activates the corresponding application icon to select the corresponding application; and
    the application icons being scrollable across the operator interface in a sequentially repetitive fashion.

15. An automobile computer accessory as recited in claim 1, wherein the fixed focus position is centered relative to any visible application icons.

16. An automobile computer accessory as recited in claim 1, wherein the operator interface indicates focus by a changed color of the focused application icon.

17. An automobile computer accessory as recited in claim 1, wherein the operator interface displays a textual name of the application corresponding to the currently focused application icon.

18. An automobile computer accessory as recited in claim 1, further comprising a general status enunciator that is presented by the operator interface when one of the application programs has information for presentation to the user.

19. An automobile computer accessory as recited in claim 1, further comprising:
   a general status enunciator that is presented by the operator interface when one of the application programs has information for presentation to the user;
   an application-specific status enunciator that is presented in conjunction with said one of the application programs that has information for presentation to the user.

20. An automobile computer accessory as recited in claim 1, wherein the focused application icon is activateable by a key and by a voice command.

21. An automobile computer accessory as recited in claim 1, wherein:
   the focused application icon is activateable by a voice command; and
   the operator interface textually displays voice command corresponding to the currently focused application icon.

22. An in-dash automotive entertainment and computer accessory, comprising:
   one or more audio entertainment applications;
   one or more navigational applications;
   one or more system utility applications;
   an operator interface that is mountable for viewing by an operator of an automobile;
   a plurality of application icons that are scrollable on the visual operator interface by a user, the application icons corresponding to different ones of the applications;
   the operator interface having a fixed focus position that is centered relative to any visible application icons, wherein any application icon that is scrolled to the fixed focus position becomes focused;
   wherein the operator interface indicates focus by a change color of the focused application icon;
   the operator interface having a plurality of keys, including a start key, a selection key, a plurality of directional navigation keys, and a plurality of numeric keys;
   wherein the selection key activates the focused application icon to select the application corresponding to the focused application icon;
   wherein the start key scrolls through the application icons;
   wherein the directional navigation keys scroll through the application icons in different directions;
   wherein the numeric keys correspond to respective ones of the application icons; and
   wherein pressing the start key followed by a particular numeric key activates the corresponding application icon to select the corresponding application.

23. An in-dash automotive entertainment and computer accessory as recited in claim 22, wherein the operator interface indicates which numeric shortcut key corresponds to a particular application icon whenever that application icon is focused.

24. An in-dash automotive entertainment and computer accessory as recited in claim 22, wherein leaving the focus on a particular application icon for a predetermined timeout activates the focused icon.

25. An in-dash automotive entertainment and computer accessory as recited in claim 22, wherein:
   leaving the focus on a particular application icon for a predetermined timeout activates the focused icon;
   pressing a numeric key activates the corresponding application icon to select the corresponding application without waiting for the predetermined timeout.

26. An in-dash automotive entertainment and computer accessory as recited in claim 22, wherein the operator interface allows the user to establish the correspondence between numeric keys and application icons.

27. An in-dash automotive entertainment and computer accessory as recited in claim 22, wherein the application icons are ordered on the operator interface in accordance with their corresponding numeric keys.

28. An in-dash automotive entertainment and computer accessory as recited in claim 22, wherein the operator interface displays a textual name of the application corresponding to the currently focused application icon.

29. An in-dash automotive entertainment and computer accessory as recited in claim 22, further comprising:
   a general status enunciator that is presented by the operator interface when one of the application programs has information for presentation to the user;
   an application-specific status enunciator that is presented in conjunction with said one of the application programs that has information for presentation to the user.

30. An in-dash automotive entertainment and computer accessory as recited in claim 22, wherein the focused application icon is activateable by a voice command.

31. An in-dash automotive entertainment and computer accessory as recited in claim 22, wherein:
   the focused application icon is activateable by a voice command; and
   the operator interface textually displays voice command corresponding to the currently focused application icon.

32. A computer-readable storage medium having instructions for implementing an operator interface in an automotive accessory, the instructions being executable to perform steps comprising:
   scrolling a plurality of application icons in response to user scroll commands, wherein the application icons correspond to different applications in the automotive accessory;
   focusing on any application icon that is scrolled to a fixed focus position; and
   activating the application corresponding to the focused application icon in response to a user selection command.

33. A computer-readable storage medium as recited in claim 32, wherein the scrolling step includes interpreting a start key as a user scroll command.

34. A computer-readable storage medium as recited in claim 32, wherein the scrolling step comprises interpreting a start key and directional navigation keys as user scroll commands.

35. A computer-readable storage medium as recited in claim 32, wherein the activating step comprises interpreting a selection key as a user selection command.

36. A computer-readable storage medium as recited in claim 32, wherein the activating step comprises automatically activating the application when the focused application icon remains focused for a predetermined timeout period.

37. A computer-readable storage medium as recited in claim 32, wherein the activating step comprises activating an application in response to a user pressing a shortcut key corresponding to the application.

38. A computer-readable storage medium as recited in claim 32, wherein the steps further comprise allowing a user to establish the correspondence between shortcut keys and application icons.

39. An in-dash automotive entertainment and computer accessory, comprising:
   an operating system having interfaces that are exposed for use by application programs;
   a plurality of application programs supervised by the operating system;
   an operator interface that is mountable for viewing by an operator of an automobile, the operating interface being of a limited size;
   the operating system having a control interface that is exposed for use by application programs, the control interface having functions that are callable to create and use a visual control for display and entry of parameters;
   the visual control having a plurality of items that are vertically scrollable through a fixed focus position; and
   the visual control being configurable to contain any one or more of the following types of items:
      an edit item having a variable that is editable in response to a user select command;
      an adjustable item having a variable that is changeable through a series of predefined values in response to user adjustment commands;
      a selection item that opens a secondary control in response to a user select command; and
      a combination item having a variable that is changeable through a series of predefined values in response to user adjustment commands, the combination item opening a secondary control in response to a user selection command.

40. An in-dash automotive entertainment and computer accessory as recited in claim 39, wherein the edit item is editable through the use of a spinner control that is opened in response to the user select command.

41. An in-dash automotive entertainment and computer accessory as recited in claim 39, wherein the visual control indicates the focus position by ballooning any text within the focused item.

42. An in-dash automotive entertainment and computer accessory as recited in claim 39, the operator interface having vertical and horizontal navigational keys, wherein the vertical navigational keys scroll the plurality of items in the visual control and a user makes the user adjustment commands with the horizontal navigational keys.

43. An in-dash automotive entertainment and computer accessory as recited in claim 39, wherein the user select command comprises a key activation.

44. An in-dash automotive entertainment and computer accessory as recited in claim 39, wherein the user select command comprises a voice command.

45. An in-dash automotive entertainment and computer accessory as recited in claim 39, wherein the visual control is configurable to be associated with a graphics image that changes to illustrate values of the item variables.

46. An in-dash automotive entertainment and computer accessory as recited in claim 39, wherein the visual control is configurable to be associated with a visual graph that changes to illustrate values of the item variables.

47. An in-dash automotive entertainment and computer accessory as recited in claim 39, wherein the visual control includes an indicator graphic along with any focused selection item and any focused combination item.

48. An in-dash automotive entertainment and computer accessory as recited in claim 39, wherein the visual control includes an indicator graphic along with any focused adjustable item and any focused combination item.

49. An in-dash automotive entertainment and computer accessory as recited in claim 39, wherein:
   the visual control includes a first indicator graphic along with any focused selection item and any focused combination item;
   the visual control includes a second indicator graphic along with any focused adjustable item and any focused combination item.

50. An in-dash automotive entertainment and computer accessory as recited in claim 39, wherein each item is configurable by an application program to include an indicator graphic that graphically indicates a property of the item.

51. A computer readable medium comprising instructions that implement an operating system for an automotive computing platform, the instructions defining an application program interface to the operating system having functions that are callable by an application program to create and use a visual control for display and entry of parameters, the visual control having a plurality of items that are vertically scrollable through a fixed focus position, the visual control being configurable by the application program through the application programming interface to contain any one or more of the following items:
   an edit item having a variable that is editable in response to a user select command;
   an adjustable item having a variable that is changeable through a series of predefined values in response to user adjustment commands;
   a selection item that opens a secondary control in response to a user select command; and
   a combination item having a variable that is changeable through a series of predefined values in response to user adjustment commands, the combination item opening a secondary control in response to a user selection command.

52. A computer readable medium as recited in claim 51, wherein the edit item is editable through the use of a spinner control.

53. A computer readable medium as recited in claim 51, wherein the visual control indicates the focus position by ballooning any text within the focused item.

54. A computer readable medium as recited in claim 51, wherein a user makes the user adjustment commands with horizontal navigational keys.

55. A computer readable medium as recited in claim 51, wherein the user select command comprises a key activation.

56. A computer readable medium as recited in claim 51, wherein the user select command comprises a voice command.

57. A computer readable medium as recited in claim 51, wherein the visual control is configurable to be associated with a graphics image that changes to illustrate values of the item variables.

58. A computer readable medium as recited in claim 51, wherein the visual control is configurable to be associated with a visual graph that changes to illustrate values of the item variables.

59. A computer readable medium as recited in claim 51, wherein the visual control includes an indicator graphic along with any focused selection item and any focused combination item.

60. A computer readable medium as recited in claim 51, wherein the visual control includes an indicator graphic along with any focused adjustable item and any focused combination item.

61. A computer readable medium as recited in claim 51, wherein:

the visual control includes a first indicator graphic along with any focused selection item and any focused combination item;

the visual control includes a second indicator graphic along with any focused adjustable item and any focused combination item.

62. A computer readable medium as recited in claim 51, wherein each item is configurable by an application program to include an indicator graphic that graphically indicates a property of the item.

* * * * *

UNITED STATES PATENT AND TRADEMARK OFFICE
CERTIFICATE OF CORRECTION

PATENT NO. : 6,201,540 B1
DATED : March 13, 2001
INVENTOR(S) : Robert Gallup et al.

It is certified that error appears in the above-identified patent and that said Letters Patent is hereby corrected as shown below:

Column 7,
Line 6, delete "s" after "APIs".

Column 8,
Line 18, delete "is" after "edit".

Signed and Sealed this

Sixth Day of November, 2001

Attest:

*Nicholas P. Godici*

*Attesting Officer*

NICHOLAS P. GODICI
*Acting Director of the United States Patent and Trademark Office*